United States Patent
Mohammad

(10) Patent No.: US 11,947,480 B2
(45) Date of Patent: Apr. 2, 2024

(54) UNIVERSAL SERIAL BUS SCHEDULING USING REAL TIME DATA

(71) Applicant: Synopsys, Inc., Mountain View, CA (US)

(72) Inventor: Saleem Chisty Mohammad, Fremont, CA (US)

(73) Assignee: Synopsys, Inc., Sunnyvale, CA (US)

(*) Notice: Subject to any disclaimer, the term of this patent is extended or adjusted under 35 U.S.C. 154(b) by 0 days.

(21) Appl. No.: 18/084,316

(22) Filed: Dec. 19, 2022

(65) Prior Publication Data

US 2023/0195670 A1 Jun. 22, 2023

Related U.S. Application Data

(60) Provisional application No. 63/291,914, filed on Dec. 20, 2021.

(51) Int. Cl.
*G06F 13/38* (2006.01)

(52) U.S. Cl.
CPC .... *G06F 13/382* (2013.01); *G06F 2213/0042* (2013.01)

(58) Field of Classification Search
CPC .. G06F 13/382; G06F 13/4282; G06F 13/385; H04J 3/16
See application file for complete search history.

(56) References Cited

U.S. PATENT DOCUMENTS

| | | | | |
|---|---|---|---|---|
| 6,567,423 B1* | 5/2003 | Iyer | ..... | H04L 25/4906 370/505 |
| 2003/0018839 A1* | 1/2003 | Ishida | ..... | G06F 13/4059 710/71 |
| 2004/0260823 A1* | 12/2004 | Tiwari | ..... | H04L 65/764 709/230 |
| 2011/0115568 A1* | 5/2011 | Wu | ..... | H03L 7/0807 331/34 |
| 2011/0208892 A1* | 8/2011 | Meyers | ..... | G06F 13/385 710/313 |
| 2013/0290817 A1* | 10/2013 | Prevost | ..... | H03M 13/4146 714/792 |
| 2013/0336334 A1* | 12/2013 | Gilbert | ..... | H04J 3/16 370/458 |
| 2018/0189224 A1* | 7/2018 | Vadivelu | ..... | G06F 13/4282 |

* cited by examiner

*Primary Examiner* — Phong H Dang
(74) *Attorney, Agent, or Firm* — Patterson + Sheridan, LLP

(57) ABSTRACT

A communication device includes controller circuitry and transmitter circuitry. The controller circuitry determines a number of strings of consecutive ones in a data packet, and determines a number of stuffed bytes based on the number of strings of consecutive ones. Further, the controller circuitry schedules a transaction packet to be transmitted within a bus interval based on a determination that a total number of bytes of the transaction packet is less than a number of available bytes in the bus interval. The total number of bytes of the transaction packet is based on a number of payload bytes of the data packet and the number of stuffed bytes. The transmitter circuitry transmits the transaction packet during the bus interval based on the controller circuitry scheduling the transaction packet for transmission.

20 Claims, 7 Drawing Sheets

```
Begin
Local Temp = MaximumPacketSize + 192
Local rvalue = TRUE
If MaximumPacketSize >= 128 then
Temp += 128 End If
If Temp > HC_BytesLeftInFrame then
Rvalue = FALSE End If
Return rvalue
End
```

```
Begin
Local Temp = CurrentPacketSize + Number of Stuffed Bytes
Local rvalue = TRUE
If Temp > HC_BytesLeftInFrame then
Rvalue = FALSE End If
Return rvalue
End
```

```
reg [31:0] data,i, j,k;
reg [31:0] bit_stuff_count;// final bit stuff count
reg [5:0] data_c; //temporary variable
reg [511:0] data_r; //input data stream initial begin
j=0;
bit_stuff_count=0;
offset=0;
data = 32'hfffffffe;
data_r = 'h3f7ffffffffe;
data_c =0;
end always @ (posedge clk) begin
 for (k=0;k<32;k=k+1)
 data [k] = data_r[j+k];
 for (i=0;i<32;i=i+1) begin
  for (k=0;k<6;k=k+1)
   data_c[k]= data[i+k];
  if ((&(data[5:0] & 6'h3F)) && (i == 0)) begin
   bit_stuff_count=bit_stuff_count+1;
   j=6;
  end
  else if (i >= j) begin
   if (&(data_c & 6'h3F)) begin
    bit_stuff_count=bit_stuff_count+1;
    j=i+6;
   end
   else begin
   end
  end
  else if (i<j) begin
  end
 end
end
```

FIG. 8

UNIVERSAL SERIAL BUS SCHEDULING USING REAL TIME DATA

CROSS-REFERENCE TO RELATED APPLICATION

This application claims the benefit of U.S. Provisional Patent Application Ser. No. 63/291,914 filed on Dec. 20, 2021, which is incorporated herein by reference.

TECHNICAL FIELD

The present disclosure relates to scheduling transactions for a communication system, and, more specifically, to scheduling transactions for a Universal Serial Bus communication system using real time data.

BACKGROUND

In the Universal Serial Bus (USB) 2.0 protocol, a zero (0) is injected (e.g., inserted) in a serial bit stream when a string of six consecutive ones (1's) are detected. Injecting 0's within the bit stream increases the number of transitions in the bit stream (e.g., on the USB communication line) such that the transmitted bit stream can be correctly received. Accordingly, a packet having a payload where the bits are 1's will take longer to transmit than a packet having a payload where the bits are all 0's. In one example, a packet includes payload bytes, Cyclic Redundancy Check (CRC) bytes, and one or more bytes for the added 0's. The number of bits corresponding to added 0's may be referred to as a number of "stuffed bytes". For a packet of 512 bytes all having a value of 1, the number of stuffed bytes is 85. Accordingly, the total number of transmitted bytes is 685 (e.g., 512 payload bytes, 2 CRC bytes, and 85 stuff bytes).

When scheduling packet transmissions, a controller of a USB communication device estimates whether a packet of size 512 bytes can be transmitted in an available time window. The controller calculates the amount of time the transmission will take based on a worst case scenario for stuffed bytes. The controller calculates the total number of bytes of a transmission based on the estimation that all of the bytes of a data packet are 1's. Accordingly, if there is time available to transmit 520 bytes, a packet of 512 bytes will not be transmitted even if the entire packet is made up of payload bytes with a value of '0' as the controller estimates 514+85 bytes will be transmitted to account for bit stuffing. Thus, transmission of the packet is deferred to the next transmission window.

A USB transmission channel is segmented into time units of 125 microseconds, called a bus interval. In each bus interval, a Start of Frame (SOF) packet is sent before the data packets are transmitted. In each bus interval, 13 packets of 512 bytes can be transmitted. The controller transmits and receives packets within 125 microsecond intervals with guard time left for a SOF transmission of a subsequent bus interval. A packet that cannot be sent in the current bus interval without overrunning the guard time is deferred to the next bus interval. Accordingly, 12 packets are transmitted in each bus interval instead of the expected 13 packets, limiting the bandwidth of the USB transmission channel.

SUMMARY

In one example, a method of the present disclosure comprises receiving at a communication device, a data packet for transmission by the communication device, the transaction packet comprising payload data of ones and zeroes; determining a number of strings of a predetermined length of consecutive ones in the payload data of the received data packet; incrementing a stuffed byte counter based on the number of determined strings of predetermined length of consecutive ones in the payload data; determining a total number of bytes for a transaction packet based on a number of payload bytes in the data packet and the incremented stuffed byte counter; determining that the total number of bytes for the transaction packet is less than or equal to an available remaining bandwidth in a current bus interval; and scheduling the transaction packet for transmission by the communication device during the current bus interval.

In another example, a communication device of the present disclosure comprises controller circuitry configured to: determine a number of stuffed bytes for a transaction packet based on a number of strings of consecutive ones in a payload of the transaction packet, wherein the strings are of a predetermined length; determine a total number of bytes in the transaction packet based on a number of payload bytes in the transaction packet and the determined number of stuffed bytes; and schedule the transaction packet to be transmitted during a current bus interval based on a determination that the total number of bytes in the transaction packet is less than or equal to a number of available bytes in the current bus interval. The communication device further comprises transmitter circuitry configured to transmit the transaction packet during the current bus interval based on the controller circuitry scheduling the transaction packet for transmission.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 8 illustrates pseudo code for detecting a presence of six consecutive ones in a data packet, according to one or more examples.

DETAILED DESCRIPTION

Figure 1:
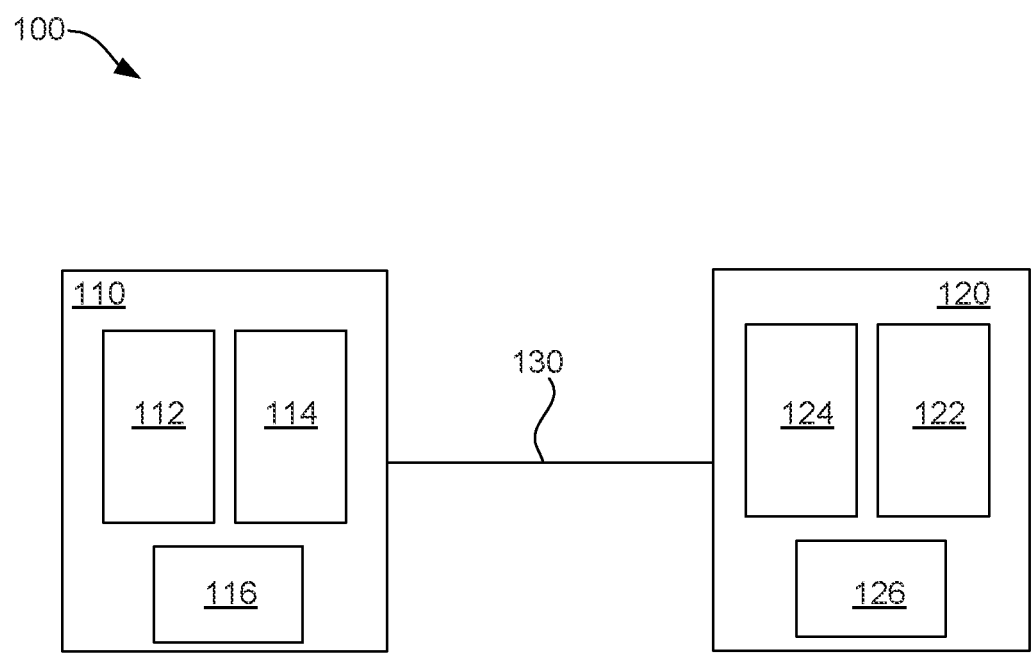
FIG. 1 illustrates a schematic diagram of a communication system, according to one or more examples.

Aspects of the present disclosure relate to Universal Serial Bus (USB) Scheduling using real time data. In exemplary embodiments, USB communication hosts and devices communicate with each other via a USB 2.0 protocol. In other embodiments, other USB protocols may also be used instead of the 2.0 protocol. The USB protocol uses stuffed bytes to inject zeros after strings of six consecutive ones. The stuffed bytes increase the number of transitions in the transmitted bit stream. Accordingly, the ability for the corresponding receiver to receive the transmitted signal (e.g., a transaction packet) is improved. However, the stuffed bytes increase the size of a transaction packet, which may cause the transmission to be deferred to a subsequent transmission window (e.g., bus interval). In one or more examples, a transaction packet includes the payload bytes of a data packet, Cyclic Redundancy Check (CRC) bytes, and stuffed bytes.

Conventional USB communication systems apply a worst case scenario with regard to the stuffed bytes when estimating the transmission time of a transaction packet. For example, a data packet of 512 bytes is estimated to have 85 stuffed bytes, as in a worst case scenario that the 512 bytes are all 1's (e.g., the data packet contains 85 strings of six consecutive 1's). Accordingly, even in instances where the data packet includes some (or all) zeros, the data packet of 512 bytes (e.g., payload bytes) is still estimated to have 85 stuffed bytes. This causes an overestimation of the time needed for transmission of the packet, and wasted (unused) bandwidth on the communication channel.

Packets are transmitted during a bus interval. Commonly a bus interval is 125 us (microseconds). However, in other examples, bus intervals may be longer or shorter than 125 us. Bus intervals are segments of a USB transmission channel. Each bus interval starts with a start of frame (SOF) packet. Further, a guard interval is added to the end of a bus interval during which transaction packets are not transmitted to ensure that a transaction packet does not overlap with the transmission of the SOF of a following bus interval.

During a bus interval, to determine if a packet can be transmitted, the amount of time to transmit the packet is determined (or estimated) based on the total number of bytes. In conventional communication systems, the total number of bytes is determined based on an estimation that the packet payload includes all 1's. Accordingly, in instances where the packet payload is made up of less than all 1's, the total size of the packet is estimated to be too large, overestimating the transmission time for the packet. Hence, a packet may be deferred to a subsequent bus interval even though it may fit within the current bus interval.

However, by determining the actual number of strings of consecutive 1's and the corresponding number of stuffed bytes before determining the total packet size, the estimate of the transmission time more accurately reflects the actual number of bytes in the packet. Accordingly, a packet may be scheduled to be transmitted during a current bus interval instead of being deferred to a subsequent bus interval, increasing the bandwidth of the communication system.

Technical advantages of the present disclosure include, but are not limited to, more accurate estimation of a transmission time needed to transmit a packet over a USB communication channel, and increased bandwidth of the USB communication system. Further, since a packet is transmitted in a current bus interval instead of being delayed to a subsequent bus interval due to overestimation of packet size, packets can be transmitted faster (in fewer bus intervals) over the USB communication channel. In addition, the amount of unused or wasted bandwidth on the communication channel is minimized.

FIG. 1 illustrates a USB communication system 100. The USB communication system 100 communicates using a USB 2.0 protocol. The USB communication system 100 includes a USB communication device 110 and a USB communication device 120. The USB communication device 110 is connected with the USB communication device 120 via the channel 130. In various embodiments, one or more of USB communication device 110 or 120 may be a USB host.

The communication device 110 includes transmitter circuitry 112, receiver circuitry 114, and controller circuitry 116. The communication device 120 includes transmitter circuitry 122, receiver circuitry 124, and controller circuitry 126. The transmitter circuitry 112 communicates transaction packets to the receiver circuitry 122 via the communication channel 130, and the transmitter circuitry 122 communicates transaction packets to the receiver circuitry 114 via the communication channel 130.

The controller circuitry 116 and the controller circuitry 126 schedules the transaction packets to be transmitted by the transmitter circuitries 112 and 122. In one example, the controller circuitry 116 and the controller circuitry 126 include one or more processors (e.g., the processing device 902 of FIG. 9) that executes instructions (e.g., the instructions 926 of FIG. 9) stored in a memory (e.g., the main memory 904 or the machine-readable storage medium 924 of FIG. 9) to determine whether or not a data packet can be transmitted during a bus interval as described herein. Further, the controller circuitries may schedule packets for transmission during a current bus interval or subsequent bus interval(s). In addition, the controller circuitries may maintain one or more counters to track an available time remaining in a current and/or subsequent bus interval(s). Moreover, the controller circuitries may maintain one or more counters to track a number of bytes and/or packets scheduled for transmission, or actually transmitted, by the transmitter circuitry for the current bus interval and/or subsequent bus interval(s).

Figures 2, 3:
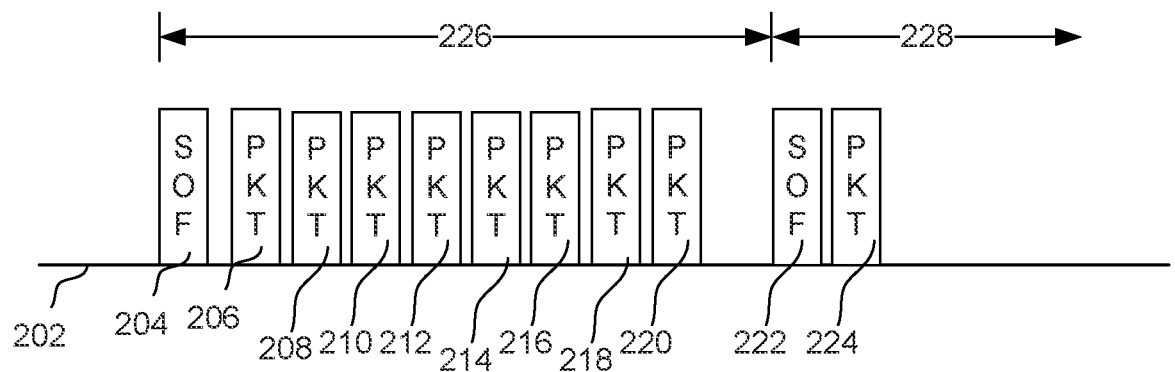
FIG. 2 illustrates a bus interval of a communication channel, according to one or more examples.
FIG. 3 illustrates an algorithm for determining whether to schedule a transaction packet in a current bus interval, according to one or more examples.

FIG. 2 illustrates an example embodiment for a USB 2.0 communication. In the exemplary figure, packets are transferred over a channel 202 (e.g., channel 130 of FIG. 1) in bus intervals 226 and 228. In exemplary embodiments, bus intervals 226 and 228 are 125 us in length. The packets may be scheduled for transmission by either controller circuitry 116 or 126 of FIG. 1.

In a first bus interval 226, a start of frame (SOF) packet 204 is first transmitted, and then packets 206, 208, 210, 212, 214, 216, 218, and 220 are transmitted over the channel 202. In the exemplary embodiment of FIG. 2, the bus interval 226 has a length of 125 us, and the controller circuitry 116 determines that the transaction packet 224 is not able to be transmitted within the bus interval 226 without overlapping the SOF packet 222 of the subsequent bus interval 228. Accordingly, the transaction packet 224 is deferred to the subsequent bus interval 228.

In one example, the estimation used to determine whether the transaction packet 224 can be transmitted during the bus interval 226 uses a worst-case scenario for the stuffed bytes of any one or more of packets 206-220, and 224. For example, the estimation may assume the payload of packet 224 comprises all ones. In one example, the controller circuitry 116 uses the algorithm 300 of FIG. 3 to determine whether the transaction packet 224 can be transmitted during the bus interval 226.

The algorithm 300 has two inputs, the current maximum packet size of the transaction packet and a hardware counter of the number of bytes left in the current micro-frame. A microframe is also sometimes referred to herein as a frame, or a bus interval. The variable HC_BytesLeftInFrame in algorithm 300 represents a time available in the current frame in terms of bytes (i.e., a number of bytes that can be transmitted in the time available for the current frame). The algorithm adds a constant of 192 to the maximum packet size to account for a first-order effect of transaction overhead and bit stuffing. Further, if the data packet size is greater than or equal to 128 bytes, then an additional constant of 128 is added to the running sum of the packet size to account for the additional worst case bit stuffing of payloads larger than 128 bytes.

In the algorithm 300, a transaction packet that may be able to fit within the remaining time of the current bus interval (e.g., the bus interval 226) is deferred to a subsequent bus interval (e.g., bus interval 228), due to the assumption of a maximum packet size and the additions of the constant(s) in estimating a packet size and corresponding amount of time needed for transmission of the packet. Hence, the bandwidth of the corresponding communication system is reduced.

Figure 4:
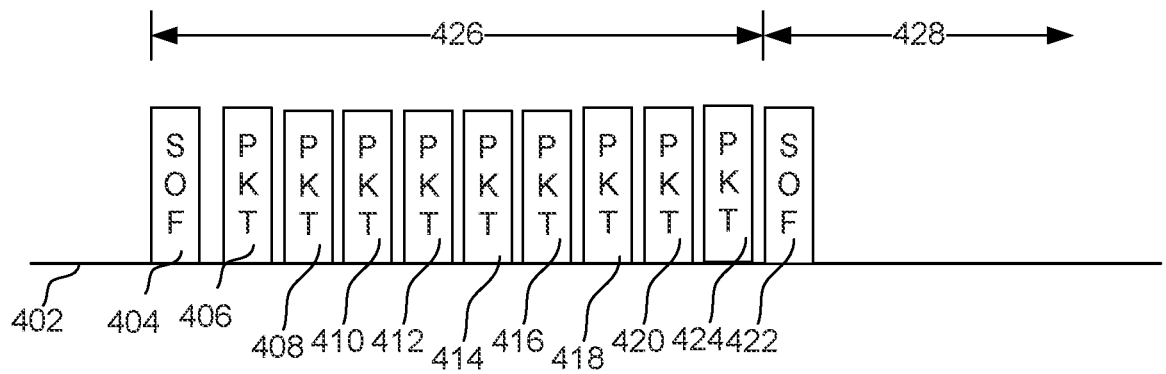
FIG. 4 illustrates a bus interval of a communication channel, according to one or more examples.

FIG. 4 illustrates another example embodiment for a USB 2.0 communication. In the exemplary figure, packets are transferred over a channel 402 (e.g., channel 130 of FIG. 1) in bus intervals 426 and 428. In exemplary embodiments, bus intervals 426 and 428 are 125 us in length. The packets may be scheduled for transmission by either controller circuitry 116 or 126 of FIG. 1.

In a first bus interval 426, a SOF packet 404 is first transmitted, and then packets 406, 408, 410, 412, 414, 416, 418, 420, and 424 are transmitted over the channel 402. Controller circuitry 116 determines that the transaction packet 424 can be transmitted during the bus interval 426 without overrunning (e.g., overlapping) the SOF 422 of the subsequent bus interval 428. Thus, in contrast to the example embodiment of FIG. 2, all of the transaction packets are transmitted within the bus interval 426 of FIG. 4.

In one example, the controller circuitry 116 estimates the transaction time of the transaction packet 424 based on the actual number of strings of six consecutive 1's and corresponding stuffed bytes, instead of a worst case scenario that may overestimate the number of stuffed bytes. Accordingly, the bandwidth of the communication system is increased.

Figure 5:
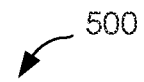
FIG. 5 illustrates another algorithm for determining whether to schedule a transaction packet in a current bus interval, according to one or more examples.

FIG. 5 illustrates an algorithm 500 for determining whether a transaction packet can be transmitted during a current bus interval based on a determined number of stuffed bytes in the transaction packet. The algorithm 500 is performed by the controller circuitry (e.g., controller circuitry 116 or 126 of FIG. 1). The controller circuitry uses algorithm 500 for each transaction packet before scheduling it for transmission by the transmitter circuitry (e.g., transmitter circuitry 112 or 122 of FIG. 1) across the communication channel (e.g., channel 130 of FIG. 1).

Instead of assuming a maximum packet size like in algorithm 300 of FIG. 3, the algorithm 500 of FIG. 5 takes into account a determined number of stuffed bytes (e.g., the variable Number of Stuffed Bytes), in addition to the actual current packet size. In one example, the controller circuitry 116 determines the number of stuffed bytes by determining the number of strings of M consecutive 1's within a packet. In various embodiments, M is 2 or more. In one specific example, M is six.

Figure 6:
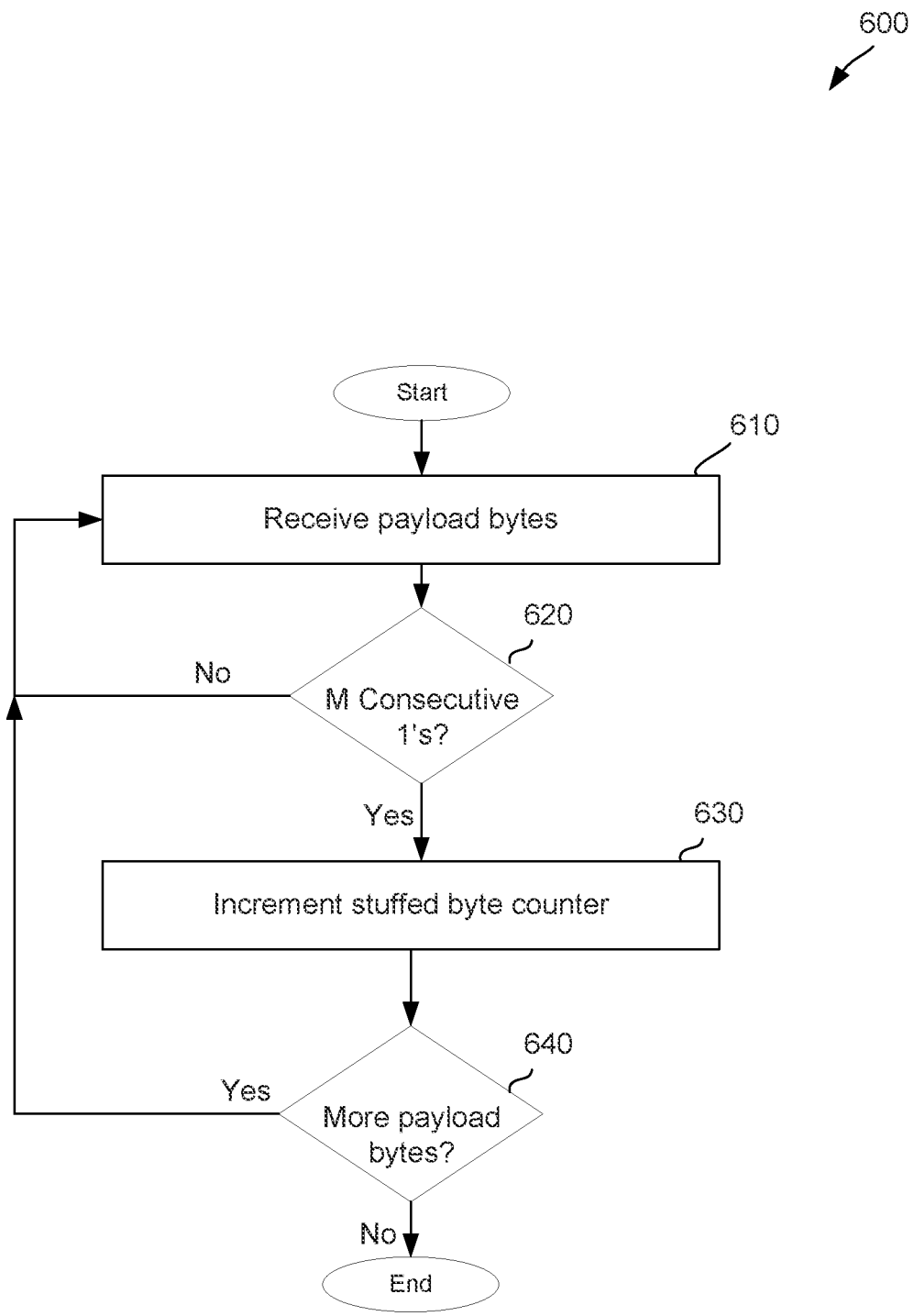
FIG. 6 illustrates a flowchart of a method for determining a number of stuffed bytes, according to one or more examples.

FIG. 6 illustrates an exemplary flowchart 600 of a method for determining the number of strings of M consecutive 1's within a packet. M can be any integer value. In one exemplary embodiment, M is six. Thus, in this embodiment, the method would determine the number of strings of six consecutive 1's within a packet. In other embodiments, the method would apply to strings of other sizes of consecutive 1's within a packet.

The exemplary method of FIG. 6 is performed by controller circuitry (e.g., controller circuitry 116 or 126 of FIG. 1). While these specific steps are depicted in exemplary flowchart 600 of FIG. 6, it will be understood that there can be fewer or additional steps in other embodiments. Further, the method steps may appear in a different order in other embodiments.

At step 610 of the method, the payload bytes of a packet are received by a communication device (such as communication device 110 or 120 of FIG. 1). Controller circuitry (such as controller circuitry 116 or 126 of FIG. 1) determines at step 620 whether a predetermined M number of consecutive 1's is present in the received payload. If not, then the method returns to step 610. If the predetermined M number of consecutive bytes is detected in the received payload, a stuffed byte counter is incremented at step 630. That is, after each M string of consecutive 1's in the payload, a stuffed byte of "0" either has been added, or will be added, to the payload before transmission. As such, a running counter is kept by the controller circuitry as to the number of actual or expected stuffed bytes for the packet.

After incrementing the stuffed byte counter, the controller circuitry determines if more payload bytes are present at step 640. If not, then the method ends for the particular packet. If there are more payload bytes remaining in the packet, then the method returns to step 620 to detect whether another M number of consecutive 1's are present in the packet payload. In this way, the method is performed until all of the bytes of the payload are analyzed. At the end of the method for a packet, the number of stuffed bytes for the packet is determined based on the count value of the counter, such that the number of stuffed bytes is equal to the number of strings of M consecutive 1's that are detected in the payload bytes.

With further reference to FIG. 5, the algorithm 500 determines a transmission time for a transaction packet based on the determined number of stuffed bytes. That is, the actual number of stuffed bytes in the packet is determined, rather than assuming that a stuffed byte is present for every six bytes in the packet. Further, the algorithm 500 determines whether or not the transaction packet can be transmitted in a current bit interval based on the estimated needed transmission time for the transaction packet and the remaining time in the bus interval (e.g., frame or microframe).

Figure 7:
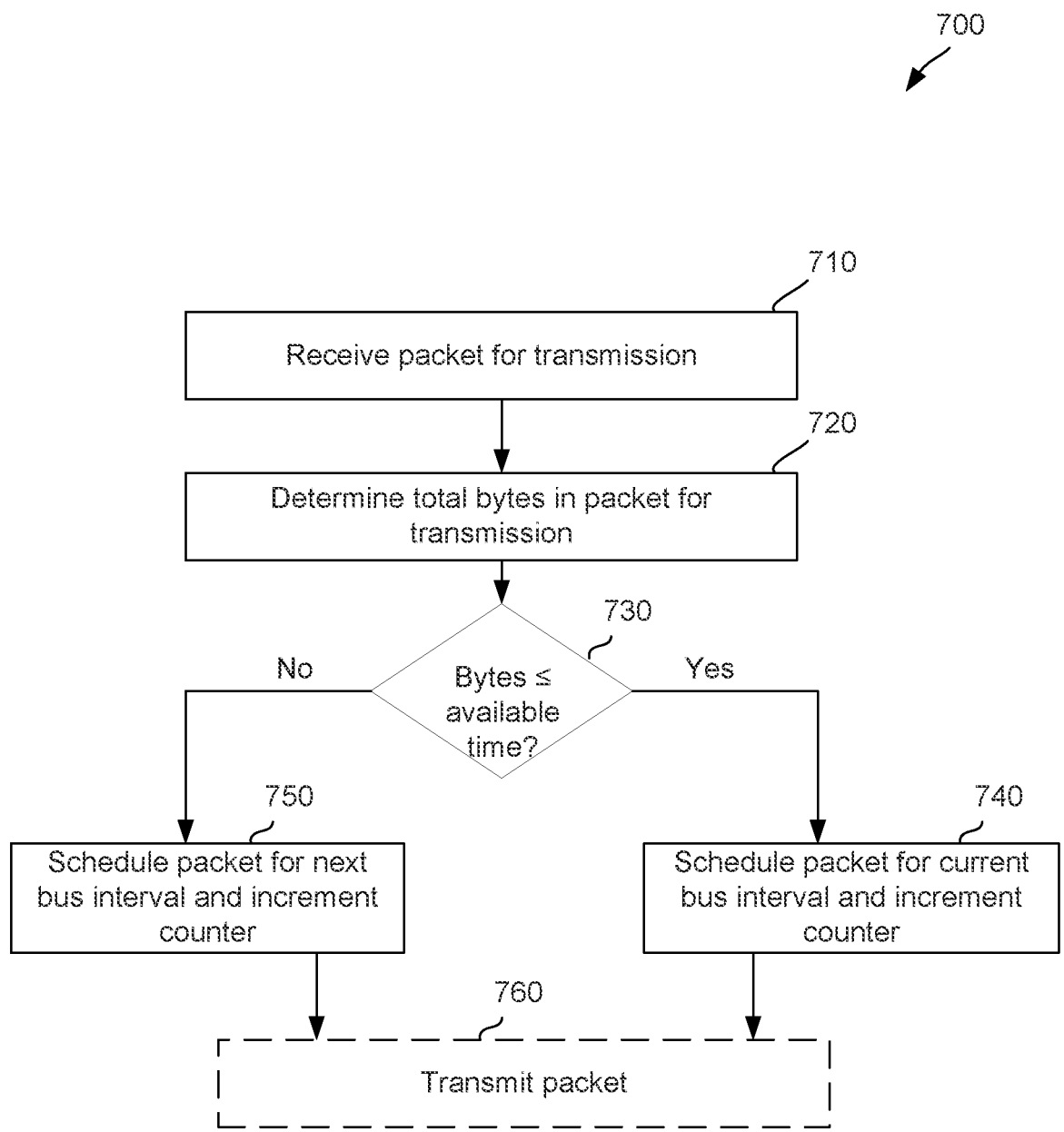
FIG. 7 illustrates a flowchart for determining a number of bytes to schedule, according to one or more examples.

FIG. 7 illustrates an exemplary flowchart 700 of a method for scheduling packet transmission in substantially real time during a bus interval. The exemplary method of FIG. 7 is performed by controller circuitry (e.g., controller circuitry 116 or 126 of FIG. 1). While these specific steps are depicted in exemplary flowchart 700 of FIG. 7, it will be understood that there can be fewer or additional steps in other embodiments. Further, the method steps may appear in a different order in other embodiments.

At step 710 of the method, a packet is received by a communication device (such as communication device 110 or 120 of FIG. 1), for transmission. Controller circuitry (such as controller circuitry 116 or 126 of FIG. 1) determines a total number of bytes in the packet for transmission. The total number of bytes can be a number of payload bytes, overhead bytes (such as CRC), and stuffed bytes. The stuffed bytes may be determined via the exemplary flowchart 600 of FIG. 6 and algorithm 500 of FIG. 5.

The controller circuitry then determines if the total bytes in the packet for transmission are less than or equal to an available remaining time of a current bus interval, at step 730. If so, then the controller circuitry of the communication device schedules the packet for transmission during the current bus interval, and increments a running counter for the bus interval by the number of bytes scheduled. In one example, the controller circuitry 116 maintains a counter based on the number of bytes that have been transmitted in a bus interval. The value of the counter corresponds to the number of bytes that can be transmitted in the current bus interval. If the total number of bytes of a transaction packet is less than the value of the counter, the data packet is scheduled to be transmitted in the current bus interval. In exemplary embodiments, the counter resets at the beginning of each bus interval, since transaction packets are transmitted in substantially real time. In this way, the transaction packet is scheduled for transmission in a bus interval based on the total number of bytes (e.g., payload bytes, overhead bytes, and stuffed bytes) being less than or equal to the remaining time of a current bus interval.

If the number of bytes in the packet is greater than an available time remaining in the current bus interval, then the controller circuitry schedules the packet to be transmitted in the next bus interval at step 750 and increments a counter for the next bus interval. In exemplary embodiments, the counter for the next bus interval begins with zero. In other embodiments, the counter begins with a value other than zero to account for a SOF packet, and/or other overhead bytes.

Optionally, the communication device (e.g., communication device 110 or 120 of FIG. 1) transmits the packet (via transmitter circuitry 112 or 122 of FIG. 1) at step 760. In some embodiments, the counter maintained in substantially real time by the controller circuitry is incremented after transmission of the packet instead of after scheduling the packet for transmission.

In one example, the available time of a current bus interval is 322 bytes. A data packet has a payload of 130 bytes, and there are no strings of six consecutive 1's. Accordingly, the number stuffed bytes is zero. Further, in accordance with algorithm 300 of FIG. 3, 192 bytes are added to the estimated packet size to account for a first-order effect of transaction overhead and bit stuffing. Based on the algorithm 300 of FIG. 3, the number of estimated bytes for the data transaction packet is 440 bytes (e.g., 130 payload bytes+192 constant bytes+128 bytes for large packet size). Accordingly, the transaction packet is not transmitted in the current bus interval since the number of estimated packet bytes exceeds the number of bytes that can be transmitted in the remaining time of the bus interval (e.g., 440 is greater than 322).

In contrast, using the algorithm 500 of FIG. 5 and the flowchart 600 of FIG. 6 for processing of the same data packet with a payload of 130 bytes and no strings of six consecutive 1's, the number of stuffed bytes is estimated to be zero. The number of estimated bytes for the transaction packet is at most 322 byes (e.g., 130 payload bytes+192 constant bytes). Accordingly, the transaction packet is scheduled to be transmitted in the current bus interval as the total number of bytes of the transaction packet is less than or equal to the number of bytes that can be transmitted in the remaining time of the bus interval (e.g., 322=322).

In various embodiments, a constant value other than 192 bytes may be used to account for a first-order effect of transaction overhead and bit stuffing. In some embodiments, a constant value of 0 may be used in algorithm 500 of FIG. 5.

FIG. 8 depicts exemplary pseudo code 800 for detecting a presence of six consecutive ones in a data stream. In the pseudo code 800, a stuffed byte counter (bit stuff count) is initially set to zero. Then, the counter begins by incrementing in units of 1 whenever a string of 6 consecutive ones is found.

Figure 9:
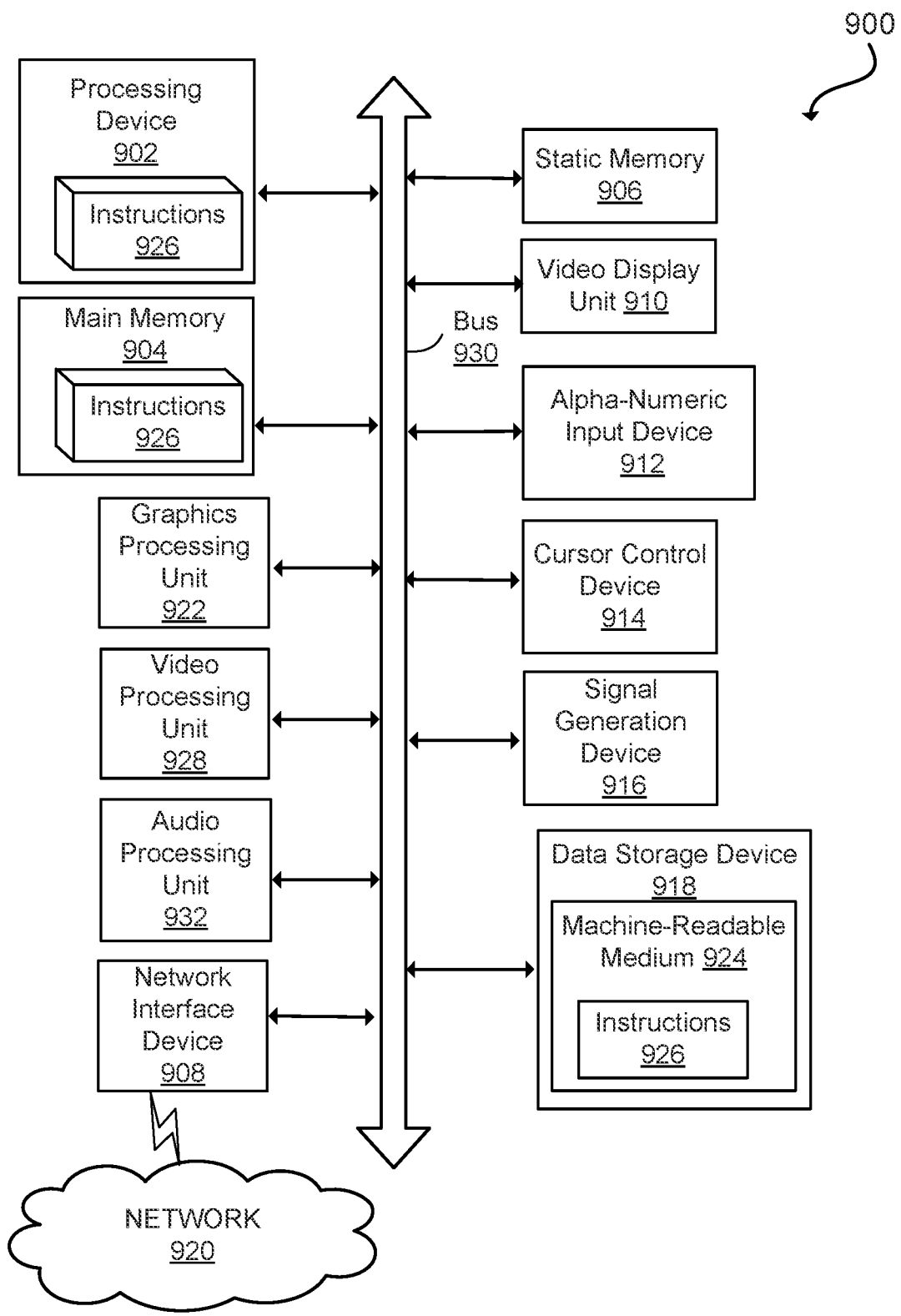
FIG. 9 depicts a representation diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A communication device comprising:
controller circuitry configured to:
determine a number of stuffed bytes for a transaction packet based on a number of strings of consecutive ones in a payload of the transaction packet, wherein the strings are of a predetermined length;
determine a total number of bytes in the transaction packet based on a number of payload bytes in the transaction packet and the determined number of stuffed bytes; and
schedule the transaction packet to be transmitted during a current bus interval based on a determination that the total number of bytes in the transaction packet is less than or equal to a number of available bytes in the current bus interval; and
transmitter circuitry configured to transmit the transaction packet during the current bus interval based on the controller circuitry scheduling the transaction packet for transmission.

2. The communication device of claim 1, wherein the predetermined length for the strings of consecutive ones in the payload of the transaction packet is a length of six.

3. The communication device of claim 1, wherein the determined total number of bytes in the transaction packet further comprises at least one overhead byte.

4. The communication device of claim 1, wherein the determined total number of bytes in the transaction packet further comprises at least one byte for a cyclic redundancy check.

5. The communication device of claim 1, wherein the communication device is a Universal Serial Bus (USB) host.

6. The communication device of claim 1, wherein the device operates under the USB 2.0 protocol.

7. The communication device of claim 1, wherein the controller circuitry is further configured to increment a running counter of the number of bytes scheduled for transmission in the current bus interval.

8. The communication device of claim 1, wherein the payload bytes in the transaction packet comprise only strings of ones and zeroes.

9. A method comprising:
receiving at a communication device, a data packet for transmission by the communication device, the data packet comprising payload data of ones and zeroes;
determining a number of strings of a predetermined length of consecutive ones in the payload data of the received data packet;
incrementing a stuffed byte counter based on the number of determined strings of predetermined length of consecutive ones in the payload data;
determining a total number of bytes for a transaction packet based on a number of payload bytes in the data packet and the incremented stuffed byte counter;
determining that the total number of bytes for the transaction packet is less than or equal to an available remaining bandwidth in a current bus interval; and
scheduling the transaction packet for transmission by the communication device during the current bus interval.

10. The method of claim 9, wherein the predetermined length of consecutive ones is a length of six.

11. The method of claim 9, wherein the total number of bytes for the transaction packet further includes at least one overhead byte.

12. The method of claim 9, wherein the total number of bytes for the transaction packet further includes at least one byte for a cyclic redundancy check.

13. The method of claim 9, wherein the communication device is a Universal Serial Bus (USB) host.

14. The method of claim 9, wherein the communication device operates under the USB 2.0 protocol.

15. The method of claim 9, further comprising transmitting, by the communication device, the transaction packet over a communication channel during the current bus interval.

16. A non-transitory computer readable medium comprising stored instructions, which when executed by a processor, cause the processor to perform a method comprising:
receiving at a communication device, a data packet for transmission by the communication device, the data packet comprising payload data of ones and zeroes;
determining a number of strings of a predetermined length of consecutive ones in the payload data of the received data packet;
incrementing a stuffed byte counter based on the number of determined strings of predetermined length of consecutive ones in the payload data;
determining a total number of bytes for a transaction packet based on a number of payload bytes in the data packet and the incremented stuffed byte counter;
determining that the total number of bytes for the transaction packet is less than or equal to an available remaining bandwidth in a current bus interval; and
scheduling the transaction packet for transmission by the communication device during the current bus interval.

17. The non-transitory computer readable medium of claim 16, wherein the predetermined length of consecutive ones is a length of six.

18. The non-transitory computer readable medium of claim 16, wherein the communication device is a Universal Serial Bus (USB) host.

19. The non-transitory computer readable medium of claim 16, wherein the communication device operates under the USB 2.0 protocol.

20. The non-transitory computer readable medium of claim 16, wherein the processor is further configured to transmit, by the communication device, the transaction packet over a communication channel during the current bus interval.

* * * * *